Dec. 8, 1936.  I. E. DOUGLAS  2,063,493
GUARD FOR CYCLE HANDLE BARS
Filed Dec. 6, 1935
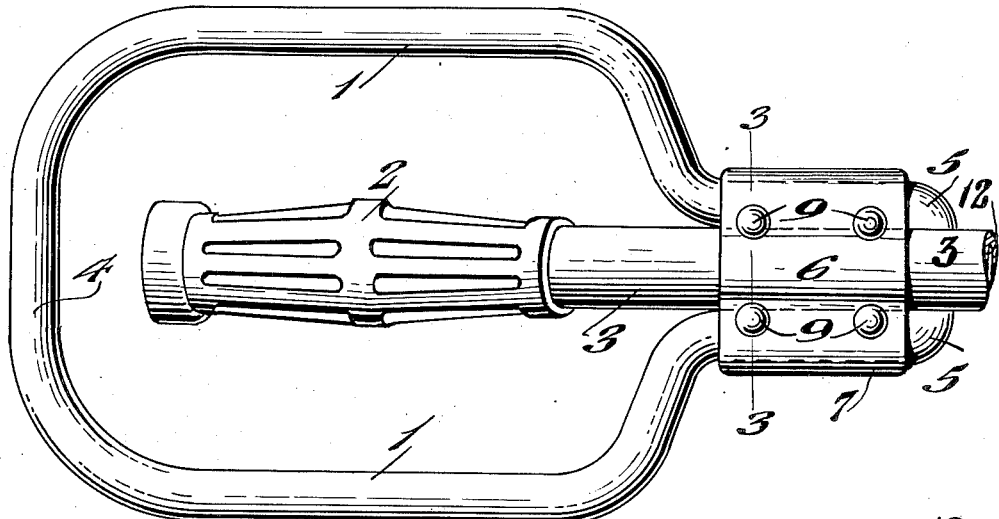
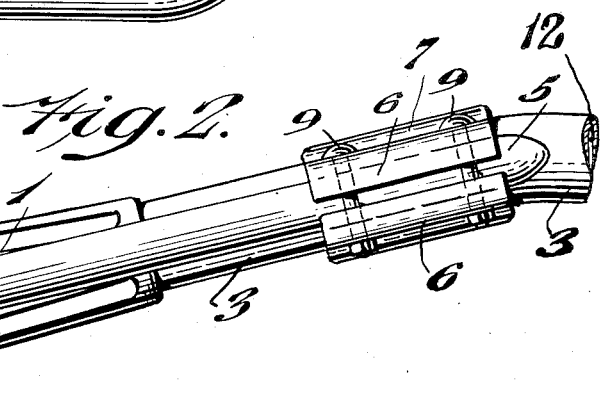
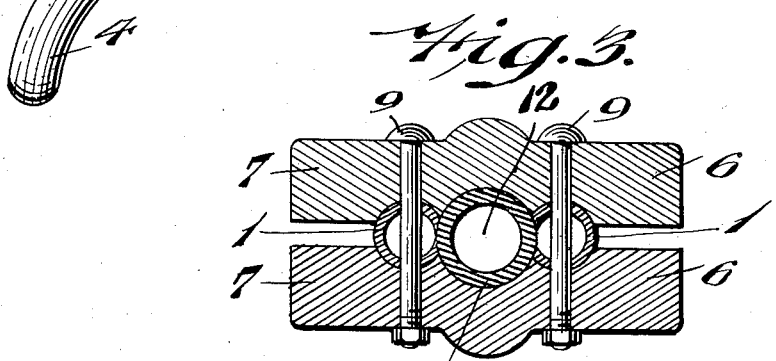
INVENTOR
ISAIAH E. DOUGLAS
BY
Wm. G. Schmidt
ATTORNEY

UNITED STATES PATENT OFFICE 2,063,493

GUARD FOR CYCLE HANDLE BARS

Isaiah Edgar Douglas, Philadelphia, Pa.

Application December 6, 1935, Serial No. 53,129

1 Claim. (Cl. 208—150)

My invention relates to improvements in cycle handles and more particularly to an improved form of guard for the handle bars of motor cycles.

An object of my invention is to provide an improved type of handle bar so designed as to protect the hands of the operator of a bicycle or a motorcycle should he be compelled through any circumstance to pass close to traffic flowing in both directions or close to any stationary object like a wall, a parked automobile or the like.

Another object of my invention is to provide an improved handle bar furnished with a strong guard for the purpose of protecting the hands and the forearms, should the machine for any reason whatever be thrown forcibly to one side or the other. Obviously, the protecting guard can prevent serious injury to the hands and the arms by absorbing the shock of the grazing contact between the handle bars and the highway.

A further object of my invention is to provide an improved handle bar with a guard member adapted to act as a rest for the forearm of the operator and to prevent his hand from becoming dislodged from the grip because of possible jars and vibrations arising from travel on the highway.

These and other objects together with the details of design and construction and the advantages arising from the use of my improved device will be disclosed more fully in the following description, appended claim and drawing in which like reference numerals indicate like parts.

Fig. 1 is a plan view of my guard for handle bars.

Fig. 2 is a side elevation of my guard.

Fig. 3 is a sectional view on line 3—3 of Fig. 1.

In Fig. 1, I is a tubular element bent in a quasi-rectangular form about the grip 2 which is attached to the handle bar 3. The tubular element I is depressed at its free end 4 and adapted to serve as a rest for the forearm of the operator. The tubular element I at its fixed end 5 is bent and cut or stamped to conform to the curved configuration of the handle bar 3 to which it is rigidly attached as shown clearly in the sectional view, Fig. 3. The attachment of the fixed end 5 of the tubular element I is effected by means of two metal blocks 6 which are relatively flat on their outer surfaces 7 but are so fabricated or cut on their inner surfaces 8 as to conform to the curved configuration of the tubular element I and the handle bar 3. The metal blocks 6 and the fixed ends of the tubular element I are drilled to receive the bolts 9 which hold the guard fixture rigidly in position.

Since my invention is applicable in particular to motorcycles, although it is operable for cycles of all kinds, the grips must be rotated about their longitudinal axes for the purpose of controlling the flow of gasoline and the adjustment of the spark. Accordingly, the device as illustrated in Fig. 1 is adaptable to nearly all models of motorcycles.

I am aware that the invention may be embodied in other specific forms without departing from the spirit or essential attributes thereof, and I therefore desire the present embodiment to be considered in all respects as illustrative and not restrictive, reference being had to the appended claim rather than to the foregoing description to indicate the scope of my invention.

Having thus described my invention, what I claim as new and desire to secure by Letters Patent is:

A device of the character described comprising a tubular element fabricated in a quasi-rectangular form and adapted to circumvent the grip of a handle bar with substantial clearance, and blocks and bolts adapted to attach the conjoined ends of said tubular element to said handle bar.

ISAIAH EDGAR DOUGLAS.